(12) United States Patent
Mizutani et al.

(10) Patent No.: US 7,929,463 B2
(45) Date of Patent: Apr. 19, 2011

(54) LAYERED CODEC DATA DISTRIBUTION APPARATUS AND METHOD

(75) Inventors: Masami Mizutani, Kawasaki (JP); Yasuhiro Kawakatsu, Kawasaki (JP); Eishi Morimatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1792 days.

(21) Appl. No.: 10/925,944

(22) Filed: Aug. 26, 2004

(65) Prior Publication Data
US 2005/0083401 A1    Apr. 21, 2005

Related U.S. Application Data

(63) Continuation of application No. PCT/JP02/01950, filed on Mar. 4, 2002.

(51) Int. Cl.
*H04L 12/00* (2006.01)
(52) U.S. Cl. .................. 370/265; 709/212; 709/232
(58) Field of Classification Search .................. 370/265; 709/212, 230, 232
See application file for complete search history.

(56) References Cited

U.S. PATENT DOCUMENTS

| | | | | |
|---|---|---|---|---|
| 6,134,243 A * | 10/2000 | Jones et al. | ................... | 370/465 |
| 6,453,355 B1 * | 9/2002 | Jones et al. | ................... | 709/230 |
| 6,512,778 B1 * | 1/2003 | Jones et al. | ................... | 370/465 |
| 6,614,844 B1 * | 9/2003 | Proehl | ................... | 375/240.08 |
| 6,714,984 B2 * | 3/2004 | Jones et al. | ................... | 709/230 |
| 6,717,952 B2 * | 4/2004 | Jones et al. | ................... | 370/465 |
| 6,744,763 B1 * | 6/2004 | Jones et al. | ................... | 370/394 |
| 6,829,648 B1 * | 12/2004 | Jones et al. | ................... | 709/230 |
| 7,366,788 B2 * | 4/2008 | Jones et al. | ................... | 709/230 |
| 7,599,434 B2 * | 10/2009 | Reynolds et al. | ........ | 375/240.01 |
| 2002/0009151 A1 | 1/2002 | Gentric | | |

FOREIGN PATENT DOCUMENTS

| | | |
|---|---|---|
| JP | 2000-078573 | 3/2000 |
| JP | 2004-505519 | 2/2004 |
| WO | 99/37057 | 7/1999 |
| WO | 02/09436 | 1/2002 |

OTHER PUBLICATIONS

Notice of Rejection Grounds for Japanese Application No. 2003-573839; mailed Apr. 11, 2006.
Y. Ito, "Streaming video era has come; from creation to delivery it's easy for everyone," Nikkei Computer Graphics., vol. 154, pp. 74-82, Nikkei Business Publications, Inc., Jul. 8, 1999.

* cited by examiner

*Primary Examiner* — Daniel J Ryman
*Assistant Examiner* — Jay P Patel
(74) *Attorney, Agent, or Firm* — Fujitsu Patent Center

(57) ABSTRACT

The side information of an MP4 file manages plural groups of hint information using plural pieces of hint information as a group, and represents how layered codec data is layer-divided. A streaming server refers to the side information, and selects a group of hint information matching a distribution service.

8 Claims, 22 Drawing Sheets

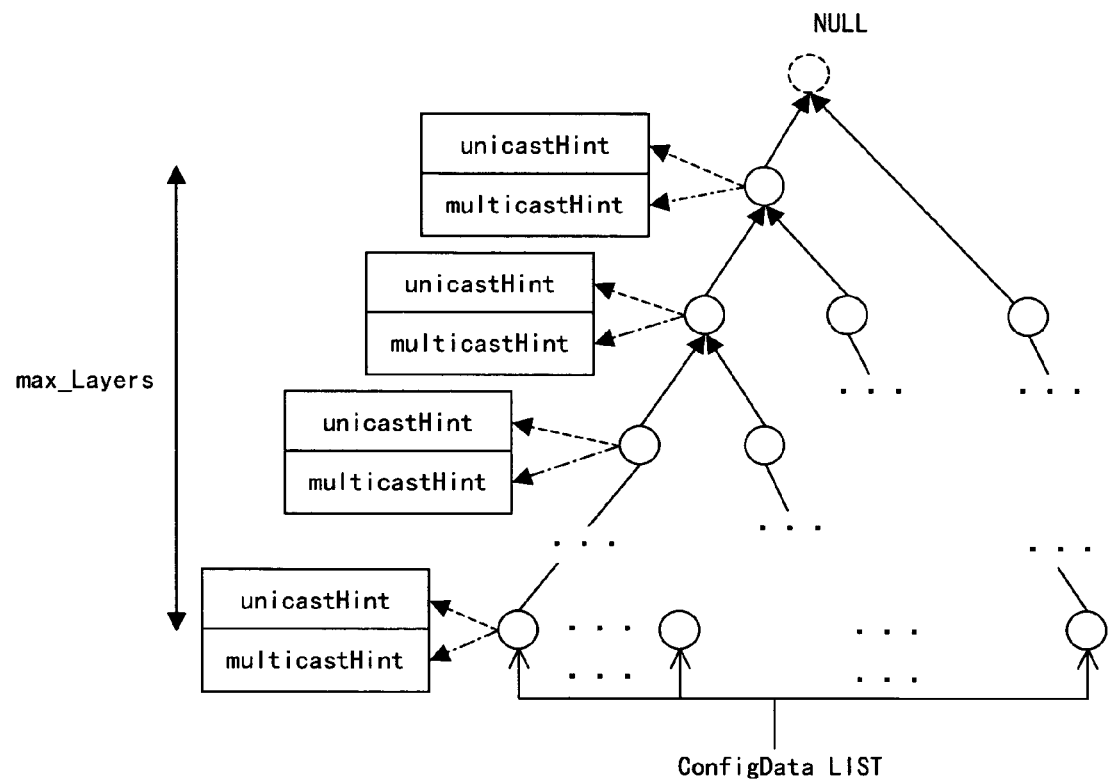
F I G. 1 1

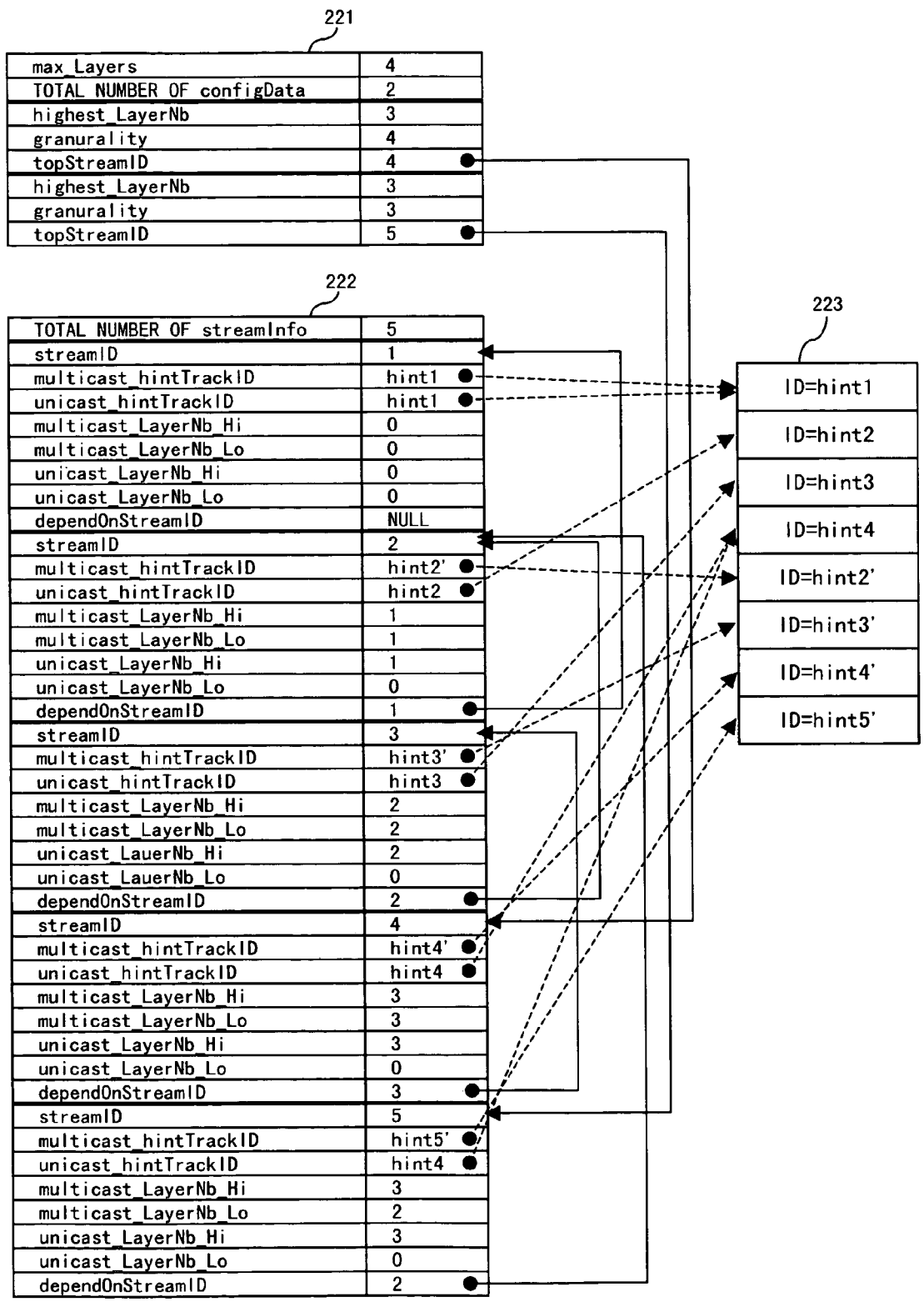
F I G. 1 3

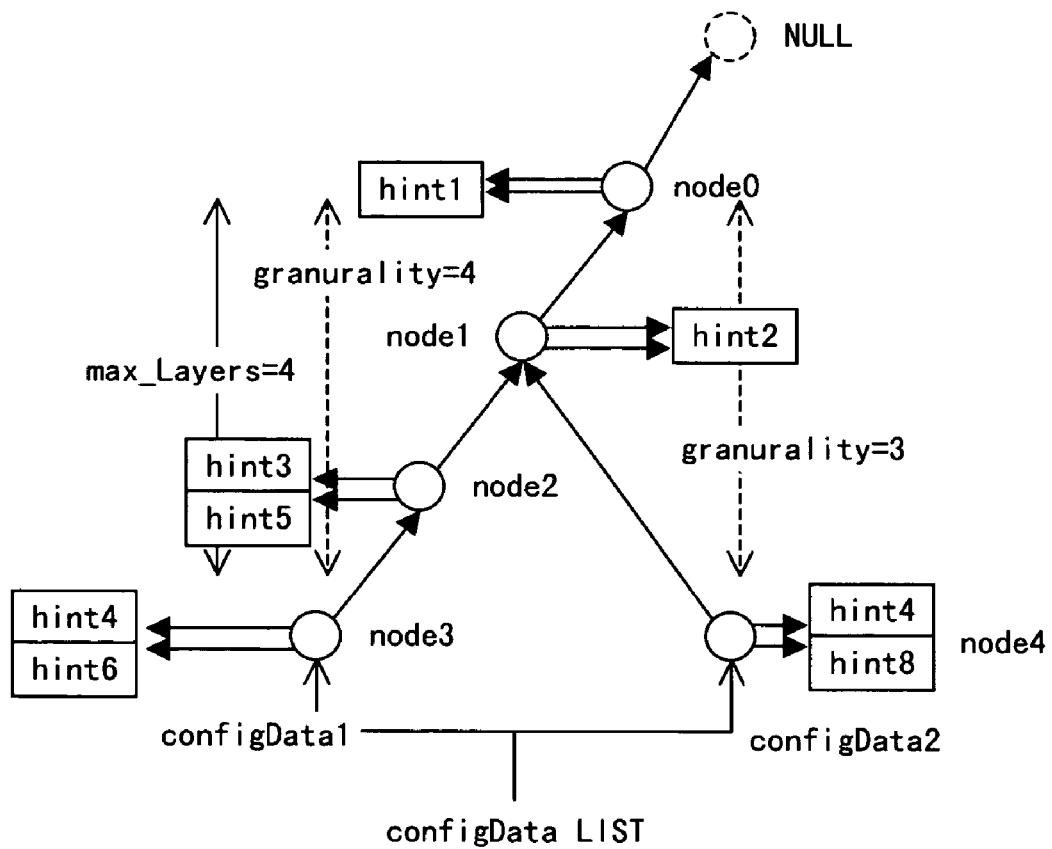
F I G. 2 2

LAYERED CODEC DATA DISTRIBUTION APPARATUS AND METHOD

CROSS REFERENCE TO RELATED APPLICATION

This application is a continuation of international PCT application No. PCT/JP02/01950 filed on Mar. 4, 2002.

BACKGROUND OF THE INVENTION

1. Field of the Invention

The present invention relates to an apparatus and a method for performing streaming distribution of digitized multimedia data such as audio, video, etc.

2. Description of the Related Art

The MPEG-4 file format (Moving Picture Experts Group phase 4 File Format (MP4)) is the international standard file format specification defined by the ISO/IEC (International Organization for Standardization/International Electrotechnical Commission) 14496-1 (MPEG-4 Systems Part), and the specification for storing audio/video codec data which is an international standard of the ISO/IEC.

When a server uses an MP4, file as a container of streaming data, hint information is used as auxiliary information for easy generation of a transport packet by the server when streaming distribution is performed. MP4 is designed to store also the hint information.

The specification of the hint information is currently being prepared by the ISO/IEC 14496-1, and the operation is being performed in accordance with the specifications of the Quick-Time (registered trademark) of Apple Inc. The specifications of the MP4 have also been improved and defined based on the specifications of the QuickTime (registered trademark).

In the hint information, a data packetizing method (dividing method) is mainly described, and the server packetizes video codec data based on the described method. In the data format of the hint information, average bit rate information and maximum bit rate information for use when video codec data is treated in the packetizing process and the streaming distribution can be described.

The server can select hint information according to the bit rate information based on the available band of a distribution network and the performance of a receiving terminal. Thus, a scalable streaming distribution can be realized.

FIG. 1 shows the configuration of the above-mentioned conventional streaming server. A server 21 shown in FIG. 1 includes a storage device 31, a packet generation unit 32, a transmission unit 33, and a hint information selector 34.

The storage device 31 is, for example, a hard disk drive, and stores a plurality of MP4 files 35. Each MP4 file 35 contains codec data 36 and plural pieces of hint information 37. The hint information selector 34 selects hint information based on the bit rate information described in the hint information 37 and the indicated distributing method, and the packet generation unit 32 packetizes the codec data 36 according to the selected hint information. Then, the transmission unit 33 transmits a generated packet to a receiving terminal through a communications network 22.

Thus, in the above-mentioned streaming distributing method, it is not necessary to divide in advance the video codec data in various packet formats and store the video codec data on a disk for each packet format. Instead, it is only necessary to store an amount of video codec data and hint information about various packetizing methods, thereby indicating an effect is improving the disk storage efficiency.

FIG. 2 shows a method for generating the MP4 file 35. A MP4 generator 44 generates the MP4 file 35 from video codec data 41 and audio codec data 42, and a hint information generator 45 generates hint information according to hint information generation designation information 43.

The MP4 file 35 generally includes moov 47 for managing various index information and mdat 48 for managing the entity of codec data. The moov 47 includes a plurality of track management units (trak) corresponding to the respective entities of codec data of the mdat 48.

For example, media track 49 manages the index of video codec data 53, and a media track 50 manages the index of audio codec data 54.

Each media track manages identification information (ID) 61, referenced identification information (Ref ID) 62, and index information (idx information) 63 as a list as shown in FIG. 3. The index information 63 is provided for each piece of codec data (access unit) of the smallest unit required in regeneration, and the n-th index information (idx information #n) includes the position information (offset Mn, size Mn) and the time information (duration Mn) in the file of the n-th access unit (AU#n).

When the hint information is stored, it is divided into a hint track in the moov 47 and a hint sample in the mdat 48. The hint sample is the information about the packetizing method for each access unit of the codec data. In FIG. 2, a hint track 51 manages a hint sample 55 for the video codec data 53 and a hint track 52 manages a hint sample 56 for the audio codec data 54.

Each hint track manages identification information (ID) 71, reference identification information (RefID) 72, bit rate information 73, and index information (idx information) 74 as a list as shown in FIG. 3. The reference identification information 72 is the identification information about a media track referenced by a hint track, and the bit rate information 73 is bit rate information about the streaming distribution in the packetizing process.

The index information 74 is provided for each packetizing method of the access unit managed by a referenced media track, and the m-th index information (idx information #m) includes the position information (offset Mm, size Mm) and the time information (duration Mm) about the m-th packetizing method (sample#m).

The sample#m indicates the dividing method of an access unit, and manages reference identification information (RefID) 75, data size (length) 76, data position (offset) 77, and identification information (AU#) 78 for each piece of the divided data.

The packet generation unit 32 shown in FIG. 1 performs a packetizing process on each access unit of the codec data managed by the referenced media track of the hint track using the information about a hint sample managed by the hint track as shown in FIG. 4. Thus, a packet including a transport header 81 and a payload 82 is generated.

Then, it is assumed that layered codec data and its hint information are stored in the above-mentioned MP4 file. The layered codec data process has no problem of extreme image degradation, but is a codec system capable of easily and stepwise adding or thinning data (stepwise image quality change) depending on the network communications status, and can be MPEG-1, MPEG-2, and MPEG-4. In the MPEG-4, an FGS (fine granular scalability) profile is well known.

As for the layer of the finest granularity of the layered codec data, a plurality of variations of hint information can be assumed depending on the variation of the layer-dividing method for determining how many layers are to be set for the thinning operation, and how each layer is paired. The variation of hint information increases depending on which is used, unicast distribution or multicast distribution.

FIG. 5 shows a data flow when unicast distribution is performed on the virtual layered video codec data. In this case, layered video codec data 91 includes three layers L0, L1, and L2, and data is distributed along one channel from the server 21 to each client.

For example, the server 21 generates a packet 101 according to the hint information #0 from the layered video codec data 91, and distributes it to a client 93 through a router 92. Similarly, packets 102 and 103 are generated according to the hint information #1 and #2, and distributes them to clients 94 and 95.

In this case, the image quality is associated with the bit rate. The client 93 receives video of the lowest image quality at the lowest bit rate. The client 95 receives video of the highest image quality at the highest bit rate. Therefore, the server 21 can select the hint information depending on the image quality by referring to the bit rate information contained in each piece of hint information.

On the other hand, when the multicast distribution is performed, it is assumed that the data flow as shown in FIG. 6 occurs. In this case, the data of each layer is distributed from the server 21 to each client along a different channel.

For example, each server 21 generates a packet 104 according to the hint information #0 (common with the hint information for the packet 101 shown in FIG. 5) from the layered video codec data 91, and transmits it to a multicast router 96. Similarly, packets 105 and 106 are generated according to the hint information #3 and #4 respectively from the layered video codec data 91, and transmitted to the multicast router 96.

The multicast router 96 distributes the packet 104 to the client 93, distributes the packets 104 and 105 to the client 94, and distributes the packets 104, 105, and 106 to the client 95. Therefore, the client 93 receives the video of the lowest image quality, and the client 95 receives the video of the highest image quality.

However, unlike the unicast distribution, since the bit rate does not reflect the image quality, the server 21 cannot select the appropriate hint information only by referring to the bit rate information.

FIG. 7 shows the configuration of a virtual MP4 file for distribution of the layered video codec data as shown in FIGS. 5 and 6. The moov 47 stores media track 111 for management of layered video codec data 117 and the hint tracks 112 through 116 for management of hint samples 118 through 122. The hint samples 118, 119, 120, 121, and 122 hold the packetizing methods of the hint information #0, #1, #2, #3, and #4 respectively.

Thus, plural pieces of hint information can be stored according to the specifications of the current MP4. However, there is a problem as follows.

(1) Although plural pieces of hint information in a layer-dividing method are stored for the layered video codec data managed by the media track, how the layered video codec data is layer-divided according to each hint information cannot be indicated. Therefore, the hint information selector 34 cannot select the hint information matching the service, and the stream data generated according to the hint information cannot be associated with the distribution port matching the service.

(2) Even if plural groups of hint information corresponding to a plurality of layer-dividing methods are stored using the above-mentioned plural pieces of hint information as a group, plural pieces of hint information cannot be managed as a group. Therefore, the hint information selector 34 cannot select a group of hint information matching the service.

(3) Since there is no information indicating a group for use in the unicast distribution or a group for use in the multicast distribution relating to the problem (2) above, the hint information selector 34 cannot select a group of hint information matching the distributing method.

SUMMARY OF THE INVENTION

The present invention aims at providing an apparatus and a method for performing streaming distribution of layered video codec data by selecting hint information matching a service from among plural pieces of hint information indicating the packetizing method of the layered video codec data.

The distribution device according to the present invention includes a data storage unit, a management information storage unit, a selection unit, and a distribution unit.

In the first aspect of the present invention, the data storage unit stores layered codec data and hint information, and the management information storage unit stores management information. The management information manages a plurality of groups of hint information for a plurality of distribution services using plural pieces of hint information as a group for distribution of the layered codec data in a layer-dividing method depending on a distribution service, indicates a correspondence between plural pieces of hint information forming each group and divided layered codec data, and also indicates a correspondence between the plurality of groups of hint information and the plurality of layer-dividing methods. The selection unit selects a group of hint information matching a target distribution service by referring to the management information, and the distribution unit packetizes and distributes the layered codec data by referring to the selected group of hint information.

The layered codec data stored in the data storage unit is the data of any medium including audio and video. Based on the management information stored in the management information storage unit, the correspondence between each of the plural groups of hint information and a layer-dividing method can be indicated, and the layer division of the layered codec data by each of the plural pieces of hint information corresponding to a layer-dividing method can be indicated.

Therefore, the selection unit can easily select a group of hint information matching the target distribution service from among the plural groups of hint information, and the distribution unit can perform the streaming distribution matching the service.

In the second aspect of the present invention, the data storage unit stores layered data and hint information, and the management information storage unit stores management information. The management information manages a plurality of groups of hint information corresponding to a plurality of layer-dividing methods using plural pieces of hint information for layer-dividing and distributing the layered data as a group, and indicates a correspondence between each layer-dividing method and each piece of hint information. The selection unit selects a group of hint information matching a target distribution service by referring to the management information. The distribution unit packetizes and distributes the layered data by referring to the selected group of hint information.

The layered data stored in the data storage unit is any data including video and audio, and can be or may not be coded. According to the management information stored in the management information storage unit, with which layer-dividing method each of the plural groups of hint information is associated can be indicated.

Therefore, the selection unit can easily select a group of hint information matching a target distribution service from among the plural groups of hint information by referring to the management information, and the distribution unit can perform streaming distribution matching the service.

The distribution device corresponds to, for example, a streaming server shown in FIG. 9 described later. In this case, the data storage unit and the management information storage unit correspond to the storage device 31, the selection unit corresponds to a hint information selector 171, and the distribution unit correspond to the packet generation unit 32 and the transmission unit 33. The management information corresponds to side information 157 shown in FIG. 8 described later.

BRIEF DESCRIPTION OF THE DRAWINGS

FIG. 11 shows the side information of a tree structure;

FIG. 13 shows the first side information;

FIG. 22 shows the second tree structure.

DESCRIPTION OF THE PREFERRED EMBODIMENTS

The embodiments of the present invention are described below by referring to the attached drawings.

According to the present embodiments, the side information is stored in the MP4 file as management information for management of plural groups of hint information with plural pieces of hint information set in a group. The side information includes the information relating to how each group of hint information layer-divides layered video codec data and the information about each group of hint information relating to a group available in multicast distribution, a group available in unicast distribution, or a group available in both.

When common hint information exists in a plurality of groups, different hint information is stored in a MP4 file excluding redundant hint information in the plurality of groups to reduce the file size.

Figure 1:
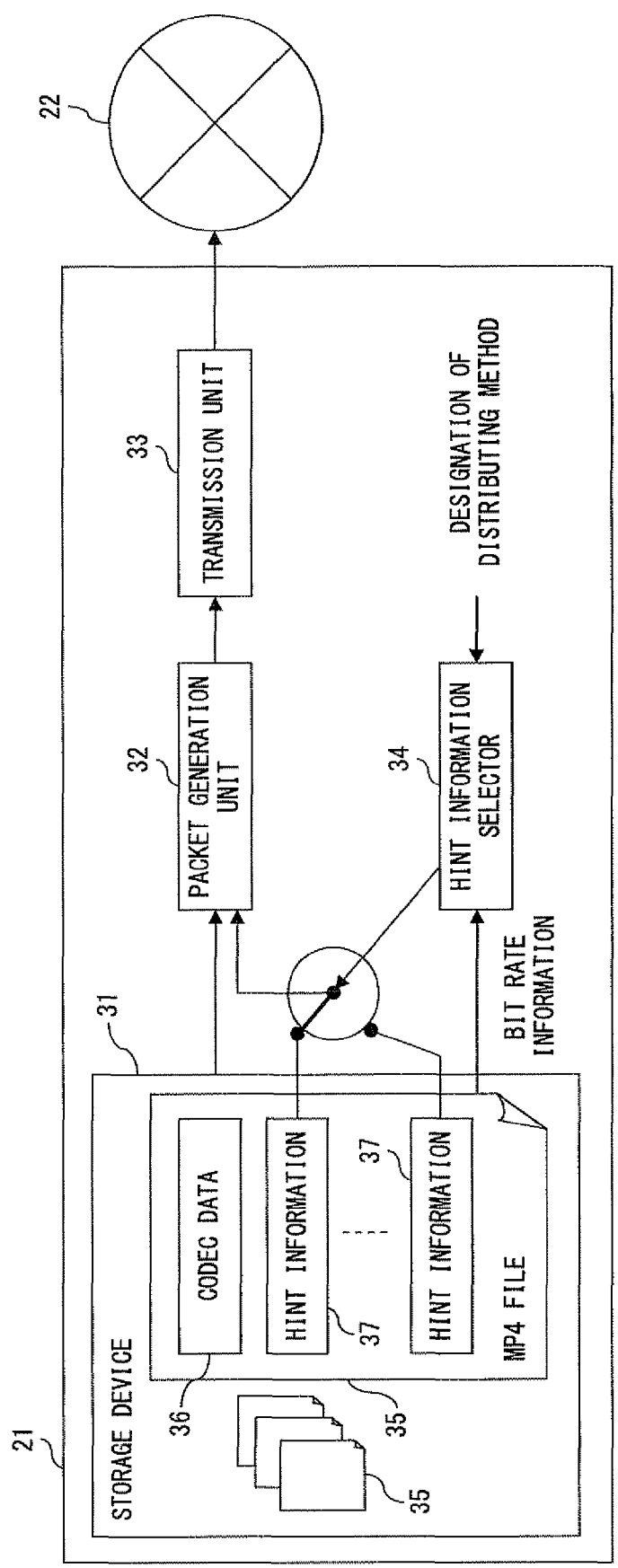
FIG. 1 shows the configuration of the conventional streaming server.
Figure 2:
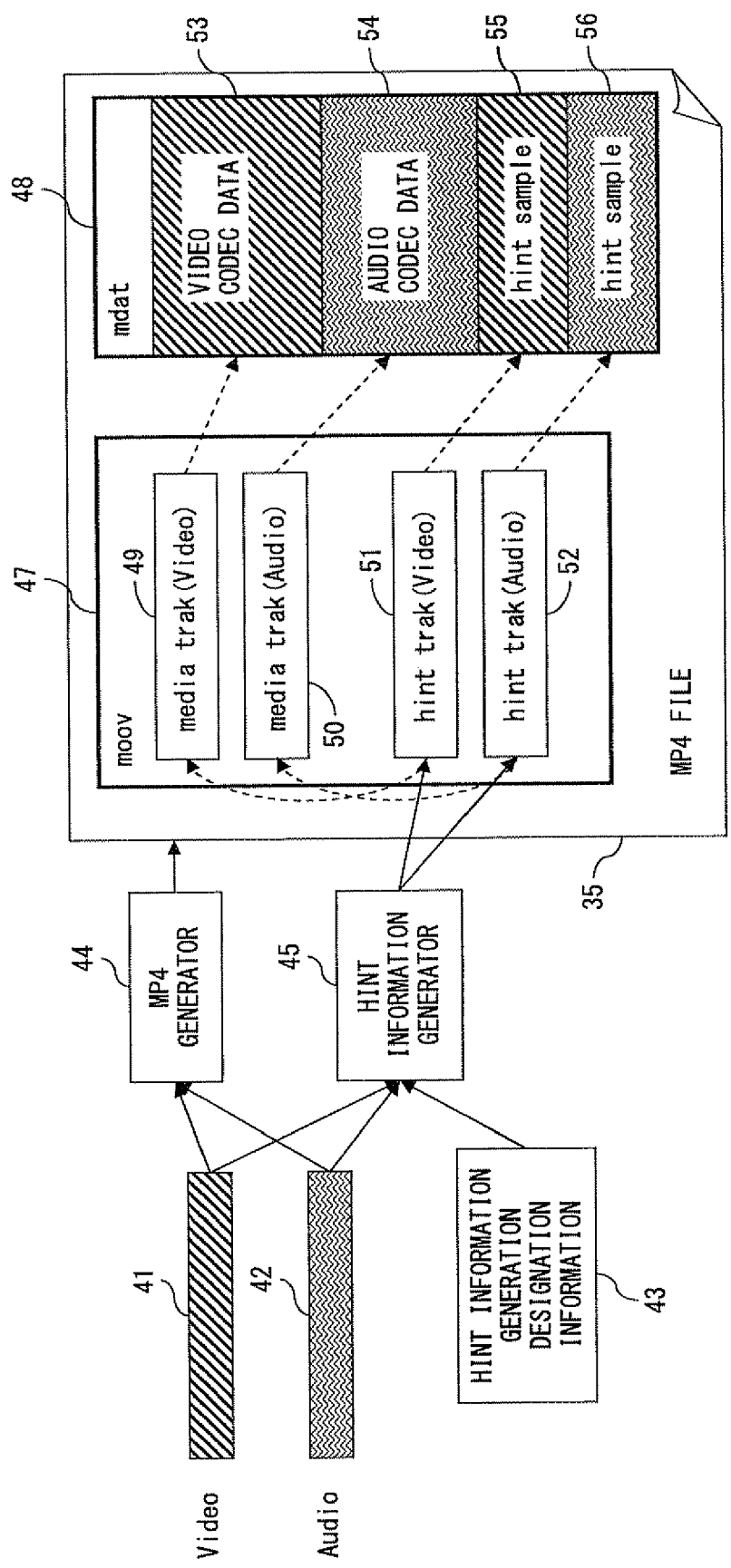
FIG. 2 shows the conventional method of generating a MP4 file.
Figure 3:
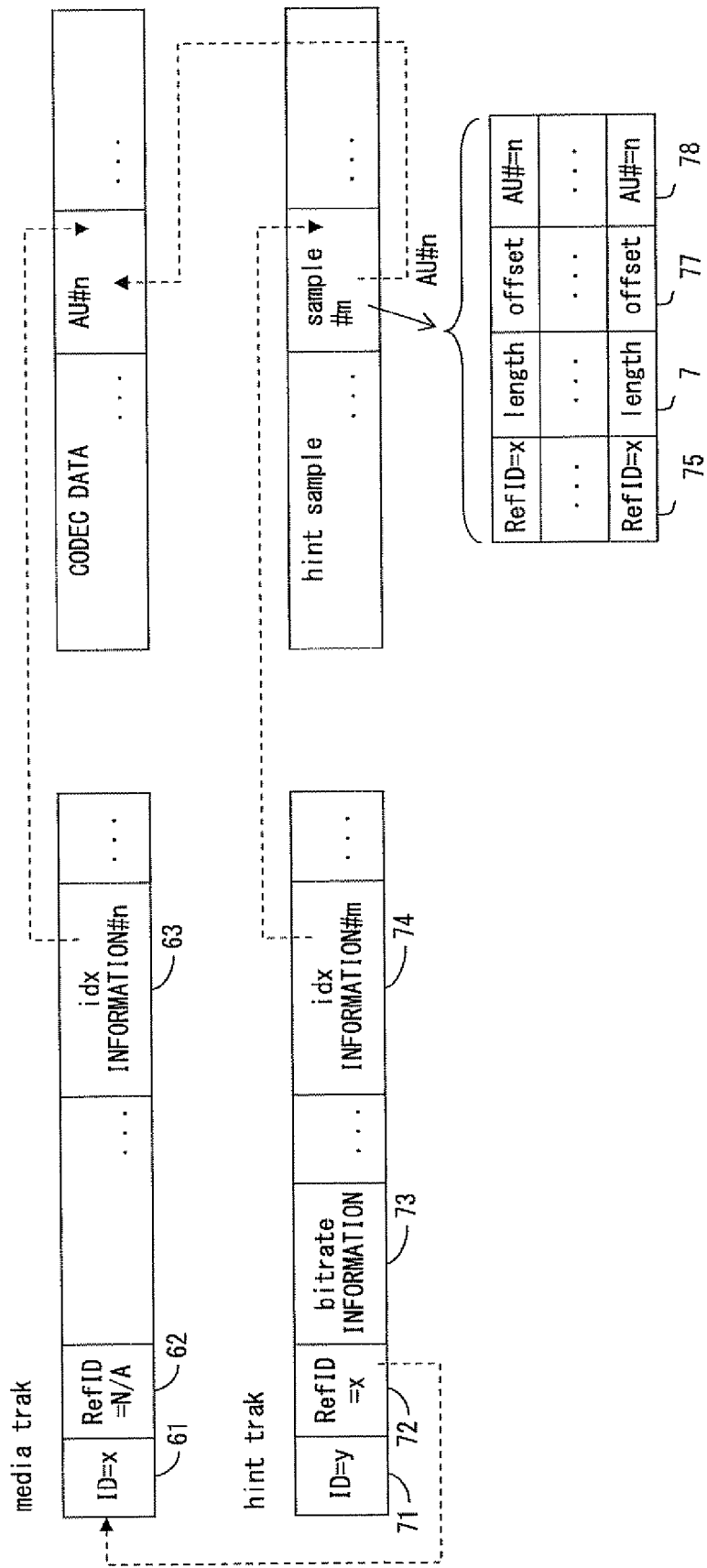
FIG. 3 shows the data structure of a MP4 file.
Figure 4:
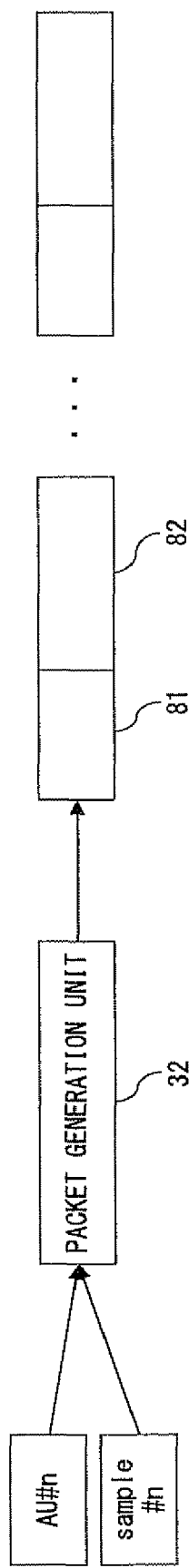
FIG. 4 shows the packet generating process.
Figure 5:
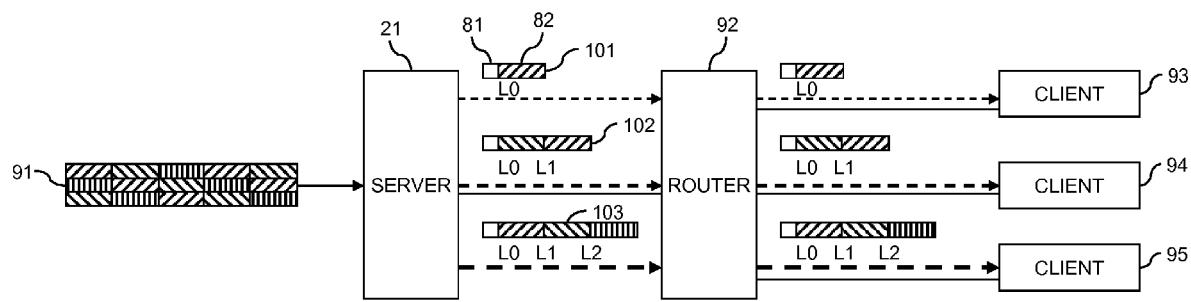
FIG. 5 shows the hypothetical unicast distribution of layered video codec data.
Figure 6:
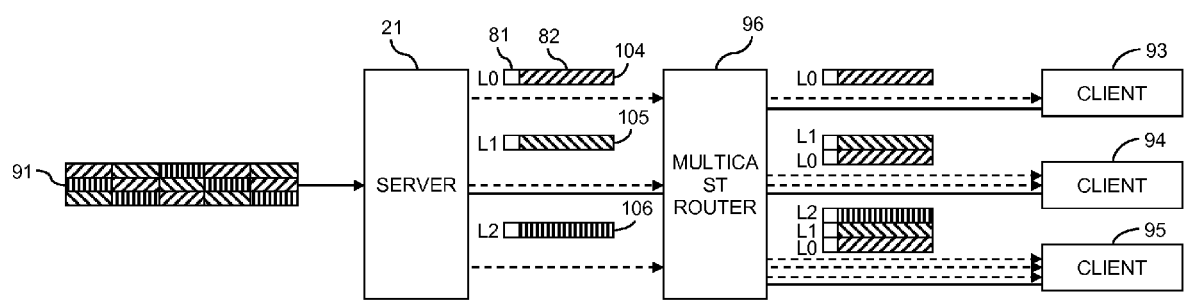
FIG. 6 shows the hypothetical multicast distribution of layered video codec data.
Figure 7:
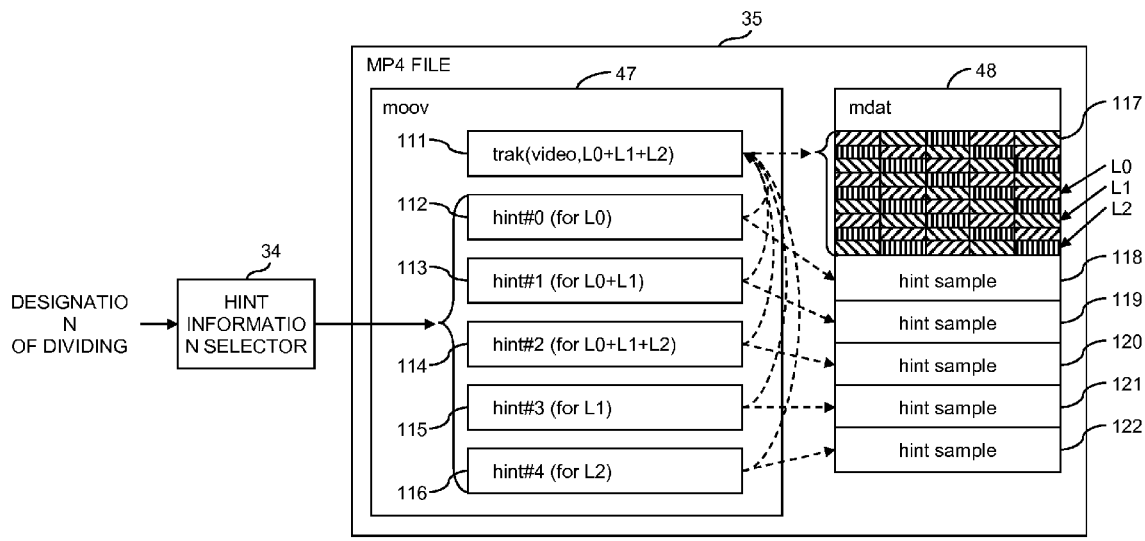
FIG. 7 shows the configuration of a hypothetical MP4 file.
Figure 8:
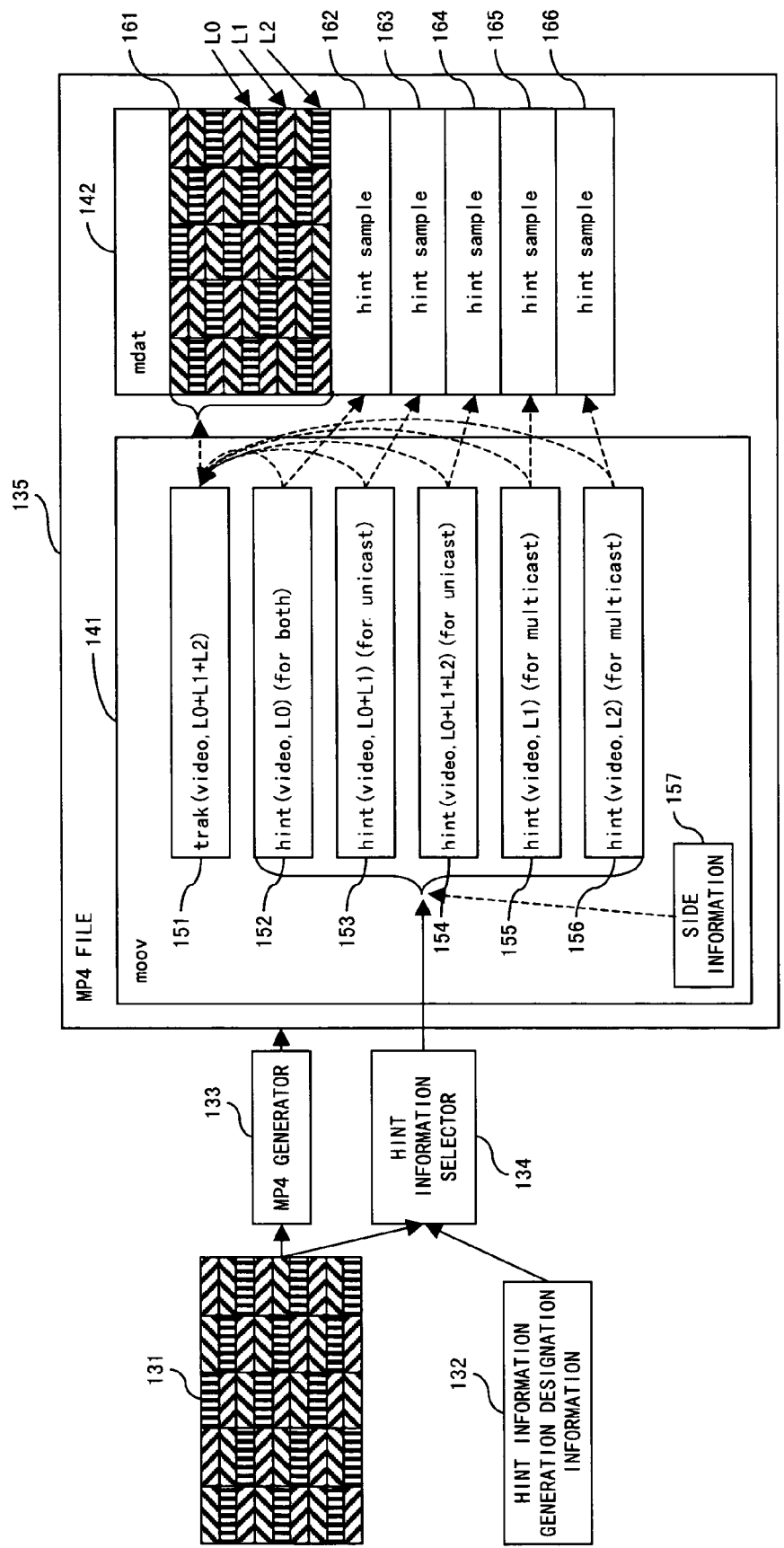
FIG. 8 shows the method of generating a MP4 file according to the present invention.

FIG. 8 shows the method of generating an MP4 file. An MP4 generator 133 generates an MP4 file 135 from layered video codec data 131, a hint information generator 134 generates hint information according to hint information generation designation information 132.

The MP4 file 135 comprises moov 141 and mdat 142. The moov 141 comprises a media track 151, hint tracks 152 through 156, and the side information 157. The mdat 142 comprises layered video codec data 161 and hint samples 162 through 166.

The media track 151 manages the layered codec data 161, and the hint tracks 152 through 156 respectively manage the hint samples 162 through 166. The hint tracks 152 through 156 hold the identification information about the media track 151 as a reference destination.

The hint sample 162 indicates the packetizing method using only the data of layer L0, and can be used for both unicast distribution and multicast distribution. The hint sample 163 indicates the packetizing method using the data of the layers L0 and L1, and is used in the unicast distribution.

The hint sample 164 indicates the packetizing method using the data of the layers L, L1, and L2, and is used in the unicast distribution. The hint sample 165 indicates the packetizing method using the data of only the layer L1, and is used in the multicast distribution. The hint sample 166 indicates the packetizing method using the data of only the layer L2, and is used in the multicast distribution.

The configuration shown in FIG. 8 is only an example, and any layered codec data formed by any number of layers and any number of corresponding hint information are stored in the MP4 file 135.

Figure 9:
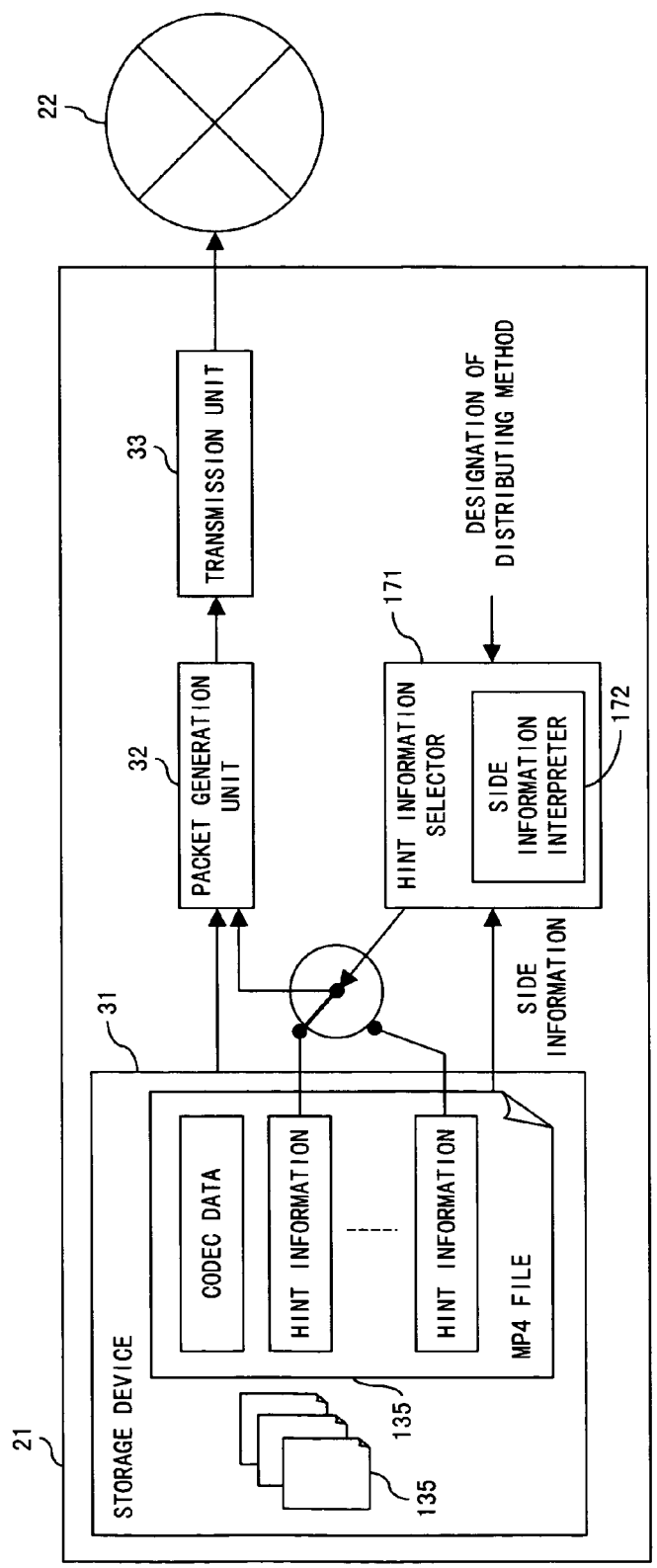
FIG. 9 shows the configuration of the streaming server according to the present invention.

FIG. 9 shows the configuration of the streaming server for distributing layered video codec data 161 of the MP4 file 135. The server 21 shown in FIG. 9 comprises the storage device 31, the packet generation unit 32, the transmission unit 33, and the hint information selector 171. The hint information selector 171 comprises a side information interpreter 172.

The storage device 31 stores a plurality of MP4 files 135. The hint information selector 171 reads the side information described in the MP4 file 135, and the side information interpreter 172 interprets the read side information. The hint information selector 171 then selects one or more pieces of hint information based on the interpretation result of the side information and the indicated distributing method, and passes the result to the packet generation unit 32. As a distributing method, for example, the image quality (data granularity) matching a service, the bit rate, the type of unicast/multicast, etc. is designated.

According to the streaming server, when layered video codec data is distributed, a group of hint information matching the service can be selected by referring to the side information, thereby realizing the appropriate streaming distribution.

The functions of the packet generation unit 32, the transmission unit 33, the hint information selector 171, and the side information interpreter 172 can be realized by either software or hardware. Software is realized by a program for enabling a CPU (central processing unit) of the server to perform a necessary process, and hardware can be realized by a DSP (digital signal processor), a logical circuit, etc.

Then the structure of the side information and an example of the method of selecting hint information are described below in detail.

The side information is formed by a plurality of stream information structures (streamInfo structure) and a plurality of data structures (configData structure) for management of two or more stream information structures. Each data structure is generated corresponding to each of a plurality of layer-dividing methods, and each stream information structure includes the reference information for reference to the hint information and the designation information for designation of the layer of divided layered video codec data.

Figure 10:
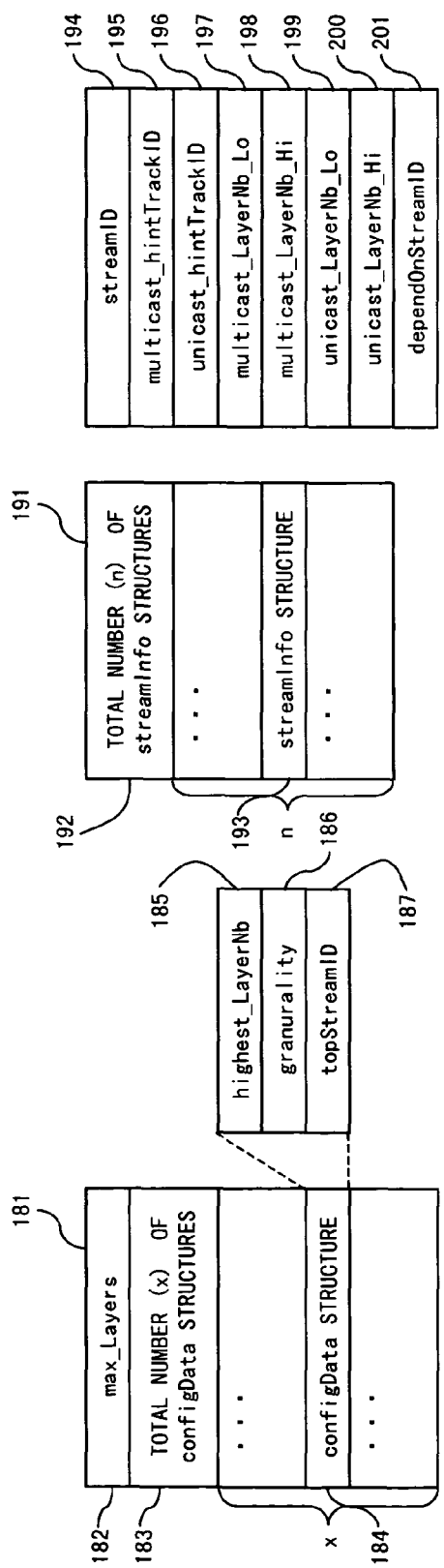
FIG. 10 shows the data structure of side information.

FIG. 10 shows the data structure of the side information per medium (video, audio, etc.). The side information has the structure of systematized variations of combination of a single layer/plural layers in accordance with the structure prescription of the finest granularity of the layered video codec data, and comprises a configData list 181 and a streamInfo list 191.

The configData list 181 comprises the finest granularity (max_Layers) 182 of the layered video codec data, a total number (x) 183 of configData structures, and a plurality of configData structures 184. Furthermore, the streamInfo list 191 comprises the number (n) 192 of streamInfo structures and a plurality of streamInfo structures 193.

Each configData structure 184 comprises highest_LayerNb 185, granularity 186, and topStreamID 187, and is generated for each layer-dividing method of the layered video codec data.

The highest_LayerNb 185 is the upper limit of the layer number assigned to the layer structure of the max_Layers 182, and the granularity 186 indicates the granularity (service granularity) of the possible stepwise image quality change. The topStreamID 187 is the identification information about the leading streamInfo structure of the streamInfo list 191.

Furthermore, each streamInfo structure 193 comprises streamID 194, multicast_hintTrackID 195, unicast_hintTrackID 196, multicast_LayerNb_Lo 197, multicast_LayerNb_Hi 198, unicast_LayerNb_Lo 199, unicast_LayerNb_Hi 200, and dependOnStreamID 201.

The streamID 194 is the identification information about each streamInfo structure 193, and the multicast_hintTrackID 195 and the unicast_hintTrackID 196 are the reference information (identification information about hint track) for reference to the hint information about the multicast distribution and the unicast distribution.

The multicast_LayerNb_Lo 197 and the multicast_LayerNb_Hi 198 are respectively the lower limit and the upper limit of the layer number corresponding to the multicast distribution, and the unicast_LayerNb_Lo 199 and the unicast_LayerNb_Hi 200 are respectively the lower limit and the upper limit of the layer number corresponding to the unicast distribution. The dependOnStreamID 201 is the identification information about the next streamInfo structure.

The side information shown in FIG. 10 is realized by the tree structure as shown in FIG. 11. Each node of the tree structure corresponds to the streamInfo structure, and the information for realizing the stepwise image quality change is represented by the dependence between the configData structure for management of the streamInfo structure of the leaf node of a tree structure and the streamInfo structure.

A streaming server first selects one configData structure from the configData list. Then, when the unicast distribution is performed, the stepwise image quality change can be realized by switching the stream data from the streamInfo structure corresponding to the topStreamID of the configData structure to the data generated based on the streamInfo structure traced by the dependOnStreamID.

When the multicast distribution is performed, the streaming server transmits the stream data, as associated with the distribution port, generated based on all streamInfo structures which can be traced by the dependOnStreamID, and the stepwise image quality change can be realized by the client notifying the multicast router whether or not the distribution from a specific port is necessary.

Figure 12:
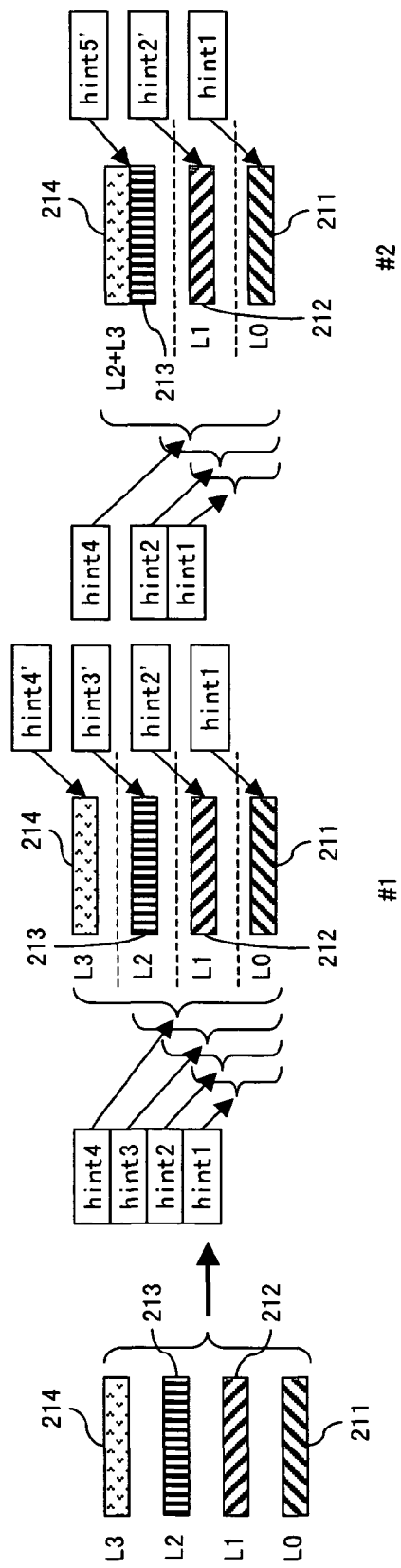
FIG. 12 shows the first example of a combination of hint information.

FIG. 12 shows an example of a combination of hint information when 4-layer stepwise image quality change is realized on the layered video codec data having the finest granularity of 4 layers (L0~L3).

In this case, since the finest granularity is 4 (max_Layers=4), the source data can be data 211 (L0), data 212 (L1), data 213 (L2), and data 214 (L3). The granularity of the stepwise image quality change to be realized can be 4 and 3. The configuration #1 corresponds to the layer-dividing method of the granularity=4 and highest_LayerNb=3, and the configuration #2 corresponds to the layer-dividing method of granularity=3 and highest_LayerNb=3.

The hint information for the unicast distribution of the configuration #1 requires hint 1 through hint 4 for transfer of codec data including each layer and layers lower than each layer. The hint 1 is used in generating a packet comprising the data 211, and the hint 2 is used in generating a packet comprising data 211 and 212. The hint 3 is used in generating a packet comprising the data 211, 212, and 213, and the hint 4 is used in generating a packet comprising the data 211, 212, 213, and 214.

The hint information for the multicast distribution can be the hint 1 and hint 2' through hint 4' for transfer of data for each layer. The hint 2' is used in generating a packet comprising the data 212, and the hint 3' is used in generating a packet comprising the data 212. The hint 3' is used in generating a packet comprising the data 213. The hint 4' is used in generating a packet comprising the data 214.

With the configuration #2, by collectively processing the higher 2 layers (L2+L3), the 3-level stepwise image quality change can be realized. The hint information for the unicast distribution of the configuration #2 can be the hint 1, hint 2, and the hint 4. The hint information for the multicast distribution can be the hint 1, the hint 2', and the hint 5'. Among them, the hint 5' is required to collectively transfer the upper two layers by generating a packet containing the data 213 and 214.

Thus, corresponding to the layer-dividing methods with the configurations #1 and #2, the two groups of hint information for the unicast distribution and the multicast distribution are required. Therefore, a total of four groups of hint information are required. FIG. 13 shows the side information for management of the hint information.

The configData list of the side information is stored in a configData storage area 221 in the MP4 file, and the streamInfo list is stored in a streamInfo storage area 222 in the MP4 file. The first and second configData structures of the configData list respectively designate the services of the configurations #1 and #2 shown in FIG. 12.

The multicast_hintTrackID and unicast_hintTrackID of each streamInfo structure of the streamInfo list refer to the hint tracks stored in a hint track storage area 223 in the MP4 file.

In the configuration #2 shown in FIG. 12, the hint information (hint 4) for the unicast distribution for transfer of the upper two layers and lower layers is the same as the hint information for the unicast distribution for transfer of the L0 through L3 in the configuration #1. Therefore, the same identification information hint 4 is written to the unicast_hint-TrackID of the fourth streamInfo structure (streamID=4) and the unicast_hintTrackID of the fifth streamInfo structure (streamID=5) shown in FIG. 13.

Thus, using the side information shown in FIG. 10, the existence of the common hint information among different groups of hint information can be described. Therefore, certain hint information can be applied to a plurality of services.

In the configurations #1 and #2, the hint information for the unicast distribution and the hint information for the multicast distribution for transfer of the L0 are the same (hint 1). Therefore, the same identification information hint 1 is written to the multicast_hintTrackID and the unicast_hintTrackID of the first streamInfo structure (streamID=1) shown in FIG. 13.

Thus, according to the side information shown in FIG. 10, certain hint information can be described for use in both unicast distribution and multicast distribution. Therefore, the hint information can be applied to two types of distributing methods.

Figure 14:
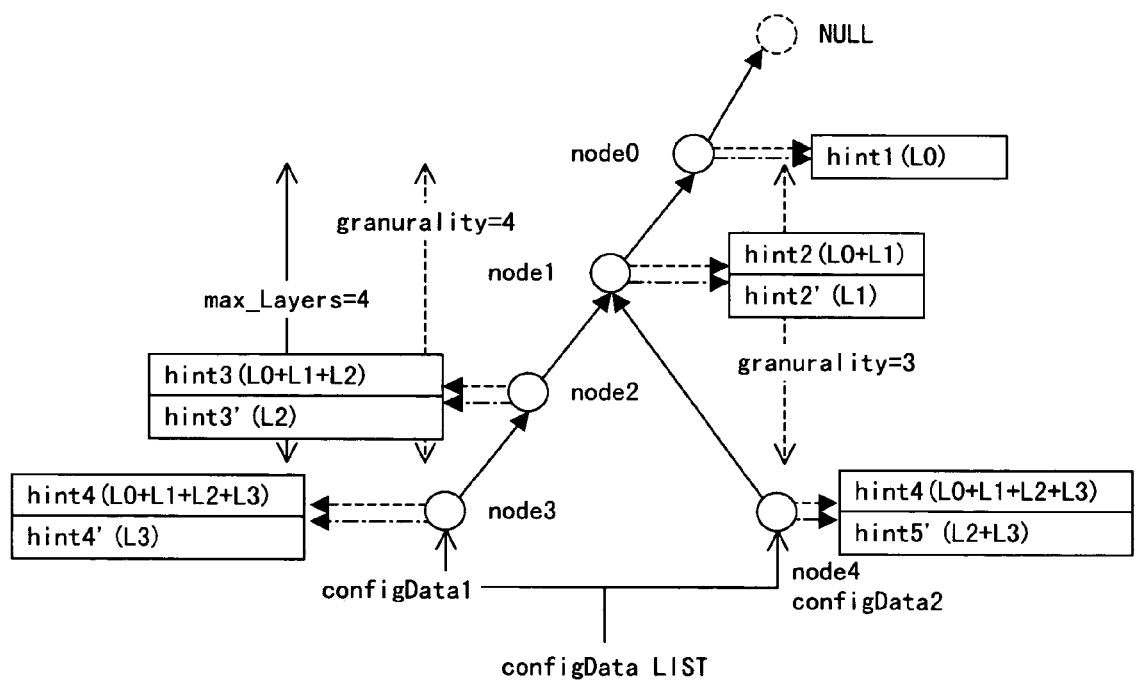
FIG. 14 shows the first tree structure.

The side information shown in FIG. 13 is represented by the tree structure as shown in FIG. 14. The configData1 shown in FIG. 14 corresponds to the first configData structure shown in FIG. 13, and four nodes can be traced from the configData1. The configData2 corresponds to the second configData structure, and three nodes can be traced from the configData1.

Figure 15:
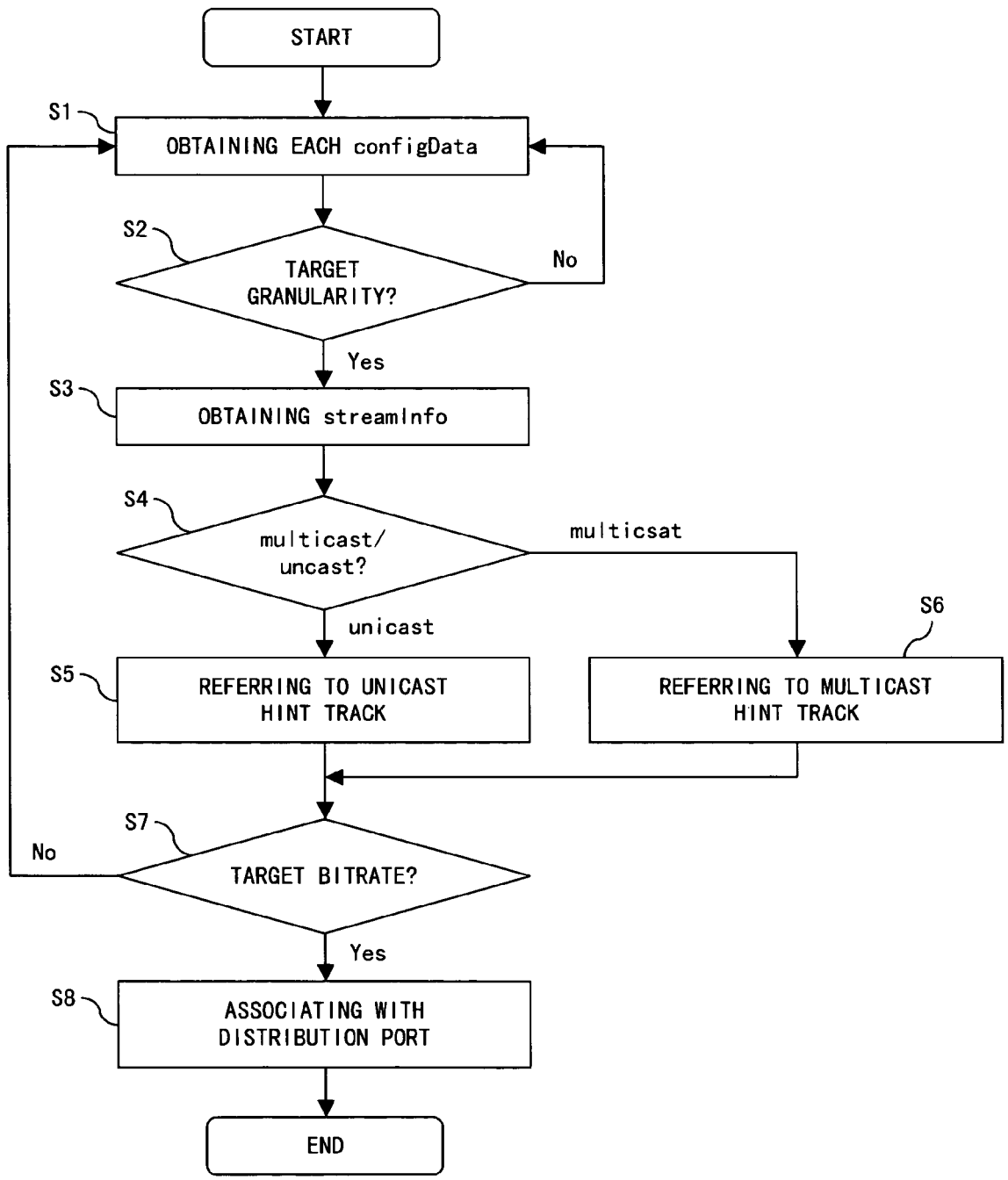
FIG. 15 is a flowchart of the operation algorithm of the hint information selector.

The principle of the operation of the hint information selector 171 for selecting the hint information according to the side information is explained below. FIG. 15 is a flowchart of the operation algorithm of the hint information selector 171.

First, the side information interpreter 172 obtains the information stored in one configData structure (step S1), and confirms whether or not the granularity value matches the target granularity of the distribution service (step S2).

When the multicast distribution is performed, it can be checked whether or not, for example, the granularity matches the number of ports required for the distribution. If the granularity does not match the service, the operations in steps S1 and S2 are repeated on the next configData structure.

If the granularity matches the service, then the information about the streamInfo structure corresponding to topStreamID is obtained, and the information about all streamInfo structures traced by the dependOnStreamID is obtained (step S3).

Then, the hint information selector 171 determines whether the target distribution service is multicast distribution or unicast distribution (step S4). If it is the multicast distribution, the hint track corresponding to multicast_hintTrackID is referred to (step S5). If it is the unicast distribution, the hint track corresponding to unicast_hintTrackID is referred to (step S6).

Then, the hint information selector 171 compares the bit rate of the stream data generated based on each referenced hint track with the bit rate of the target distribution service, and determines whether or not it is appropriate for the service (step S7). If the bit rate is not appropriate for the service, the operations in and after step S1 are repeated on the next configData structure.

If the bit rate is appropriate for the service, the stream data generated based on each hint track is associated with the distribution port (channel) to be used in the target distribution service (step S8).

When the multicast distribution is performed, the stream data generated based on each hint track is associated with the distribution port according to the dependence of the streamInfo structure. When the unicast distribution is performed, a hint track for generation of the stream data at the bit rate appropriate for the first distribution is selected, and the generated stream data is associated with the distribution port.

With the above-mentioned association, one or more pieces of hint information matching the service is selected from among plural pieces of hint information, and passed to the packet generation unit 32. The packet generation unit 32 generates a packet based on the hint sample of the selected hint information, and the transmission unit 33 transmits the generated packet through the distribution port.

For example, when the unicast distribution is performed in the layer-dividing method of the configuration #1 shown in FIG. 12, the group of hint 1 through hint 4 is selected. When the multicast distribution is performed, the group of the hint 1 and the hint 2' through the hint 4' is selected. When the unicast distribution is performed in the packetizing method of the configuration #2, then a group of the hint 1, hint 2, and hint 4 is selected. When the multicast distribution is performed, the hint 1 and hint 2' through hint 5' is selected.

Although not shown in FIG. 12, a plurality of different layer-dividing methods can be normally considered using the same granularity, and the MP4 file stores the hint information corresponding to those layer-dividing methods. In this case, using the side information as shown in FIG. 10, plural groups of hint information can be managed depending on the layer-dividing method, and a group of hint information for realization of the bit rate appropriate for the service can be selected.

Plural groups of hint information can be provided to realize a bit rate appropriate for a service. In this case, the operations in steps S1 through S7 are repeated on all configData structures so that plural groups of hint information matching a service can be selected.

The relationship between the layered video codec system of the MPEG-4 and the side information is concretely explained by referring to FIGS. 16 through 22.

Figure 16:
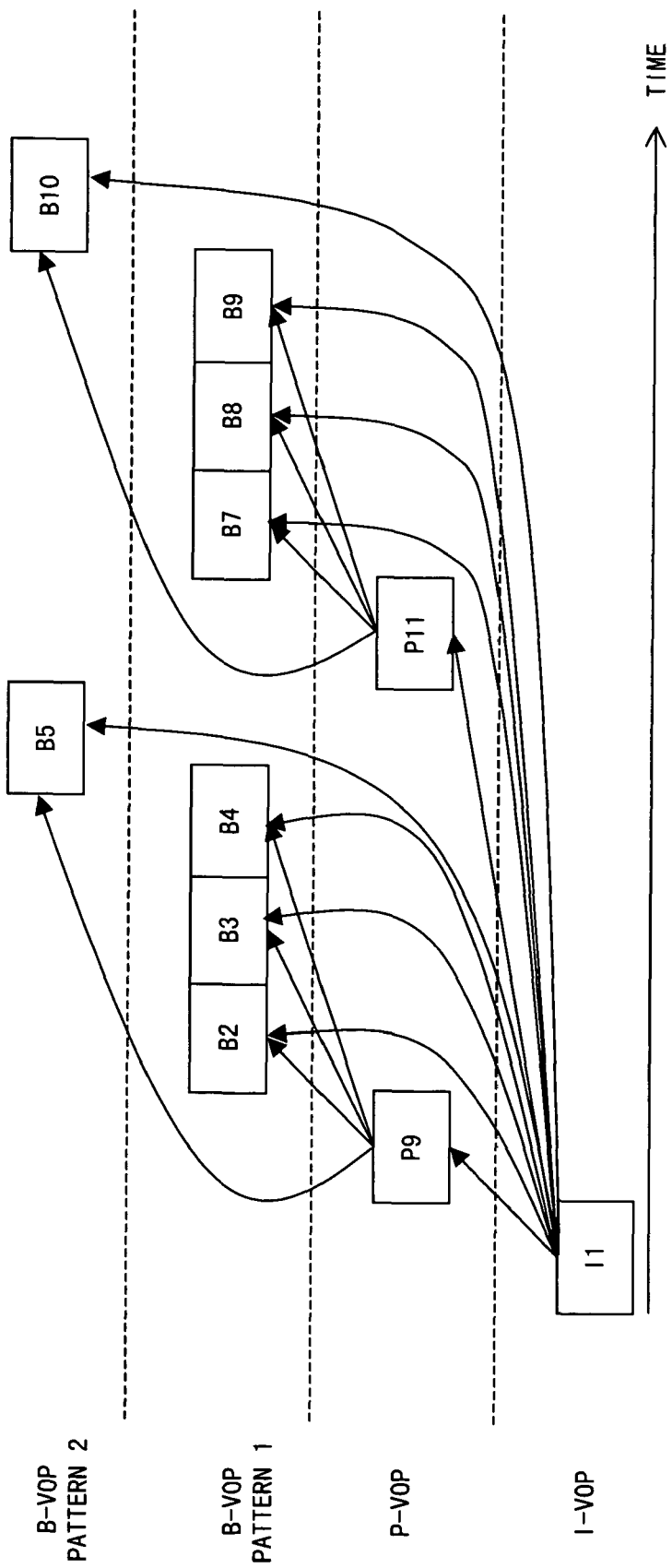
FIG. 16 shows the first layered video codec data of the MPEG-4.

In the video coding system of the MPEG-4, the video codec data is layer structured by the dependence (I, P, B) of VOP (video object plane) as shown in FIG. 16. In FIG. 16, the horizontal axis indicates the display time of the frame, and the temporal scalability is displayed. I-VOP (I1) is an intra-frame coding VOP, P-VOP (P6, P11) is an inter-frame forward prediction coding VOP, and B-VOP (B2 through B5, B7 through B10) is an inter-frame bidirectional prediction coding VOP.

Figure 17:
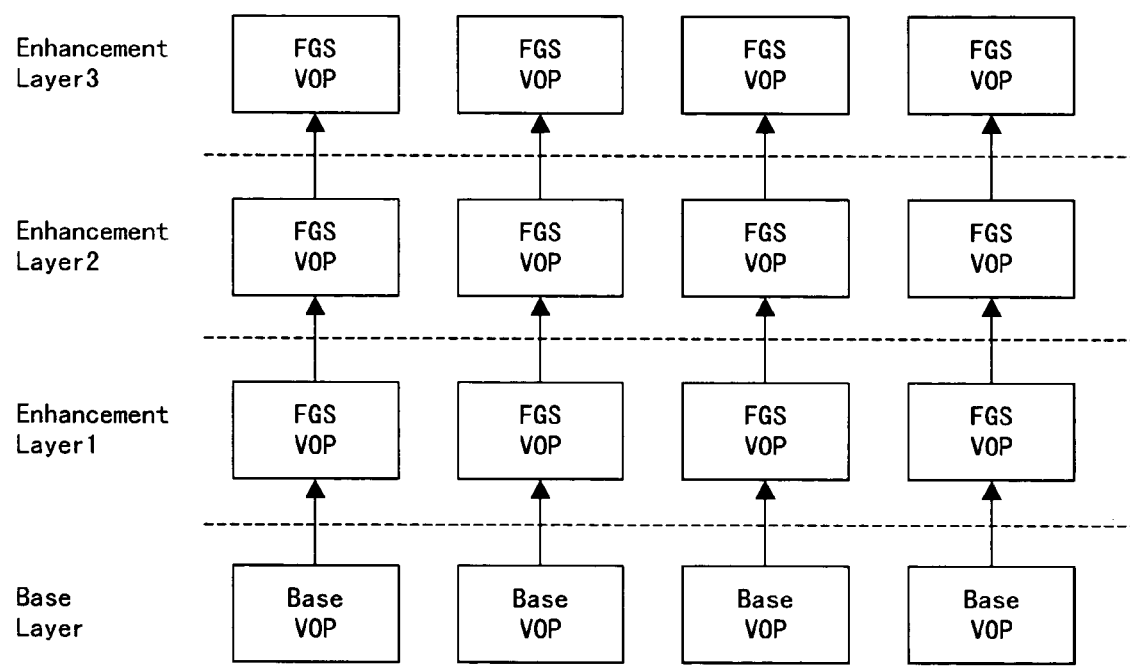
FIG. 17 shows the second layered video codec data of the MPEG-4.

In the FGS system which is a profile of the MPEG-4 video, the video codec data is layer structured as shown in FIG. 17 such that the codec data can be added regardless of the type of the VOP. In FIG. 17, at the same time of the VOP of the base layer, the VOP of the enhancement layer is added, and the spatial scalability is indicated.

The above-mentioned two distributing methods, that is, the unicast and multicast distribution, can be applied to the layered video codec data shown in FIGS. 16 and 17. Assume that the layered video codec data can be divided in the finest granularity of four layers. In this case, the MP4 file corresponding to the layer structure of the MPEG-4 is as shown in FIG. 18, and the MP4 file corresponding to the layer structure of the FGS is as shown in FIG. 19.

Figure 18:
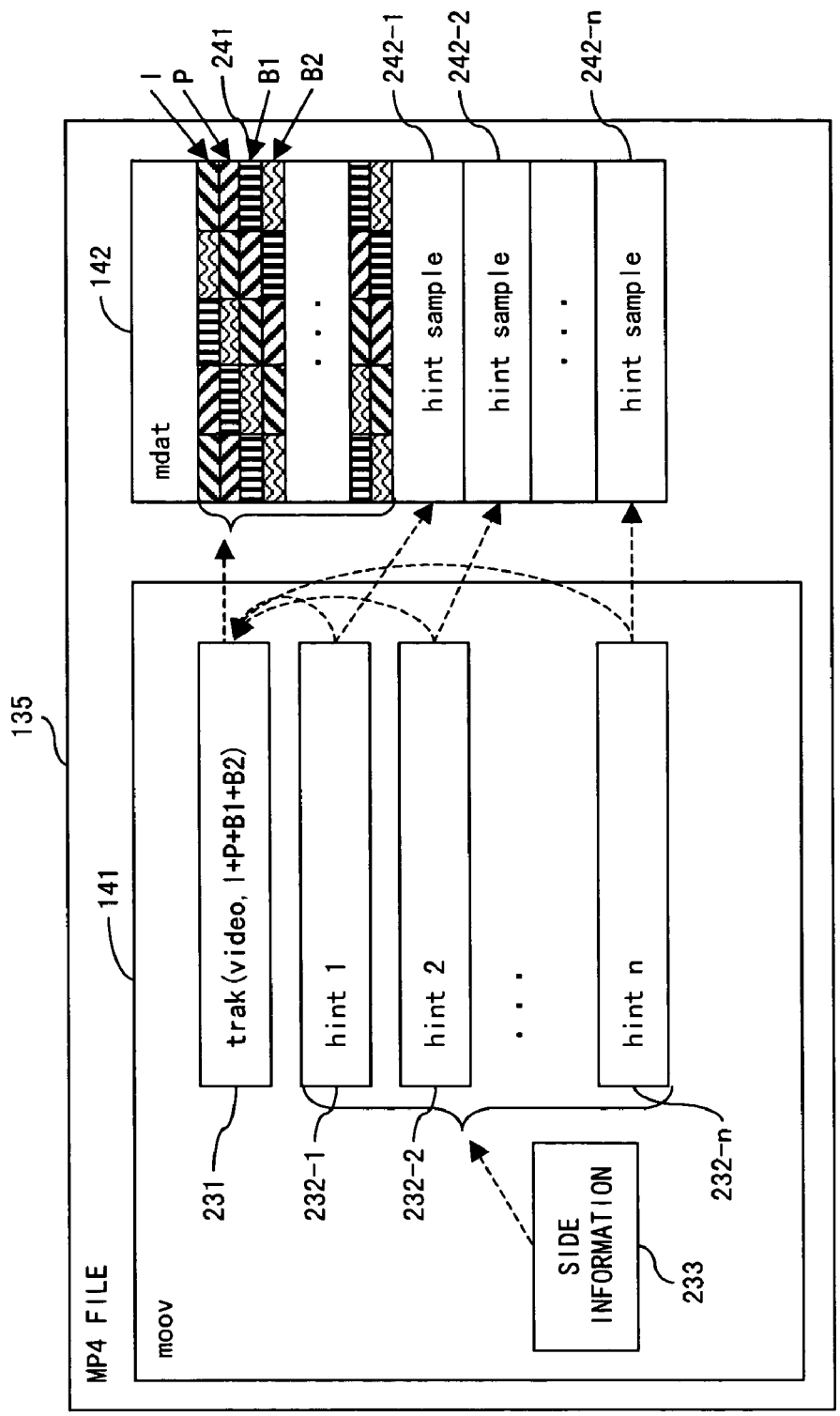
FIG. 18 shows the first MP4 file.
Figure 19:
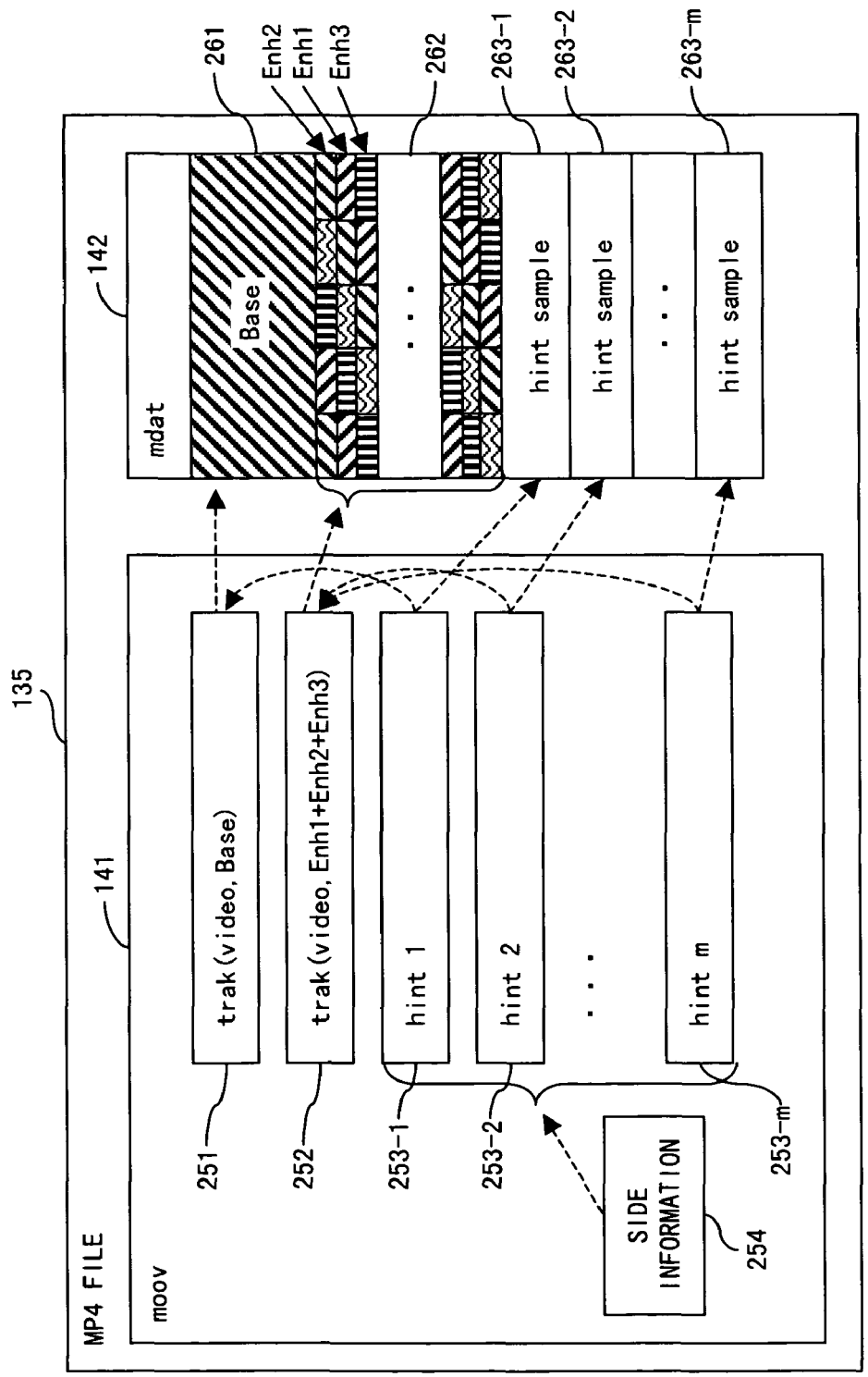
FIG. 19 shows the second MP4 file.

In the MP4 file 135 shown in FIG. 18, the moov 141 includes a media track 231, hint tracks 232-1 through 232-$n$, and side information 233, and the mdat 142 includes layered video codec data 241 and hint samples 242-1 through 242-$n$ as shown in FIG. 16.

The media track 231 manages the layered video codec data 241, the hint tracks 232-1 through 232-$n$ manage the hint samples 242-1 through 242-$n$ respectively. The hint tracks 232-1 through 232-$n$ store the identification information about the media track 231 as a reference destination.

Assume that the prescription of the finest granularity of the layered video codec data indicates the following four layers.
(1) data of only I-VOP
(2) data of I-VOP+P-VOP
(3) data of appropriately thinned B-VOP+I-VOP+P-VOP
(4) complete data of I-VOP, P-VOP, and B-VOP.

First, the I-VOP, P-VOP, B-VOP pattern 1, and B-VOP pattern 2 shown in FIG. 16 are associated with the L0, L1, L2, and L3, and the 4-layer stepwise image quality change is realized. In this case, as with the configuration #1 shown in FIG. 12, the hint 1 and hint 2' through hint 4' are required as the hint information for the multicast distribution, and the hint 1 through hint 4 are required as the hint information for the unicast distribution.

Then, the 3-layer stepwise image quality change is realized by collectively processing the B-VOP pattern 1 and the B-VOP pattern 2 without dividing the B-VOP pattern 1 from the B-VOP pattern 2. In this case, as with the configuration #2 shown in FIG. 12, the hint 1, hint 2', and hint 5' are required as the hint information for the multicast distribution, and the hint 1, hint 2, and hint 4 are required as the hint information for the unicast distribution.

The hint 5' is used for the collective transfer of the B-VOP with the configuration #2, and the hint 4 is used for a transfer of the B-VOP pattern 1 and the layers (all layers) at and lower than the pattern 2 with the configurations #1 and #2.

The side information for realization of these services is the same as that shown in FIG. 13, and the operation of the hint information selector is the same as that shown in FIG. 15.

In the MP4 file 135 shown in FIG. 19, the moov 141 includes media tracks 251 and 252, hint tracks 252-1 through 253-*m*, and side information 254. The mdat 142 includes layered video codec data 261 and 262, and hint samples 263-1 through 263-*m* as shown in FIG. 17. The layered video codec data of the FGS is stored as divided into the data 261 of the base layer and the data 262 of the enhancement layer.

The media track 251 manages the data 261 of the base layer, the media track 252 manages the data 262 of the enhancement layer, and hint tracks 253-1 through 253-*m* manage the hint samples 263-1 through 263-*m* respectively. The media track 252 and the hint track 253-1 stores the identification information about the media track 251 as a reference destination, and the hint tracks 253-2 through 253-*m* store the identification information of the media track 252 as a reference destination.

When the FGS profile is used, the operation of the hint information selector is the same as that shown in FIG. 15. Although in the unicast distribution, the base layer and the enhancement layer can be distributed using separate ports.

Figure 20:
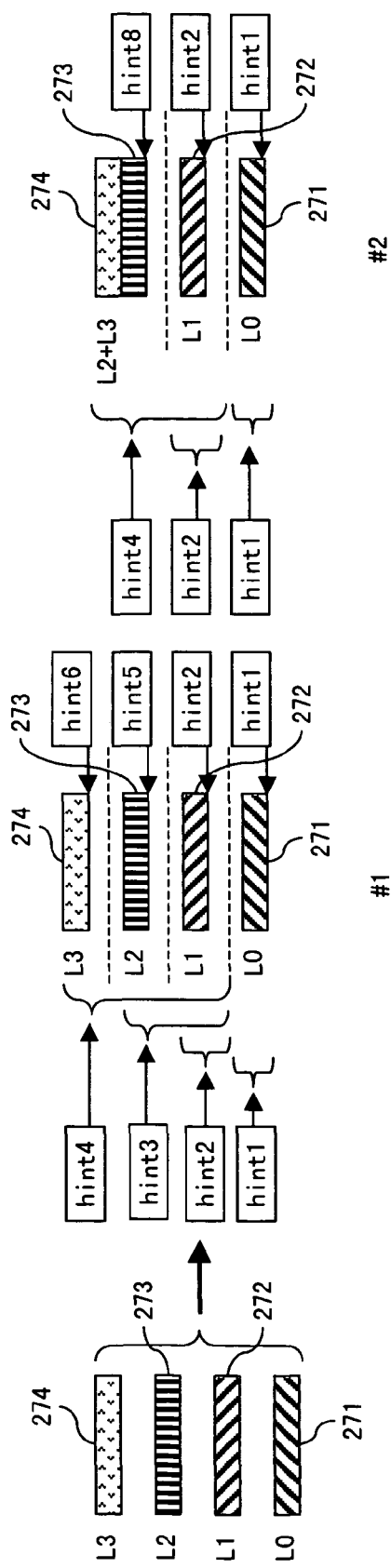
FIG. 20 shows the second example of a combination of hint information.

FIG. 20 shows an example of a combination of hint information. Assume that the finest granularity is 4 (max_Layers=4). Then, four types of source data, that is, data 271 (L0), data 272 (L1), data 273 (L2), and data 274 (L3), are used. Among them, the data 271 corresponds to the base layer shown in FIG. 17, and the data 272, 273, and 274 respectively correspond to the enhancement layers 1, 2, and 3 shown in FIG. 17.

The configuration #1 corresponds to the layer-dividing method of granularity=4 and highest_LayerNb=3, and the configuration #2 corresponds to the layer-dividing method of granularity=3 and highest_LayerNb=3. With the configuration #2, the upper two layers (L2+L3) of the enhancement layer are collectively processed.

The hint information for the unicast distribution of the configuration #1 can be the hint 1 for a transfer of the data 271 of the base layer, and the hints 2 through 4 for a transfer of the data at and lower than each layer of the enhancement layer.

The hint information for the multicast distribution can be the hint 1, hint 2, hint 5, and hint 6 for a transfer of data for each layer.

The unicast distribution for the unicast distribution of the configuration #2 can be the hint 1, hint 2, and hint 4, and the hint information for the multicast distribution can be the hint 1, hint 2, and hint 8.

Figure 21:
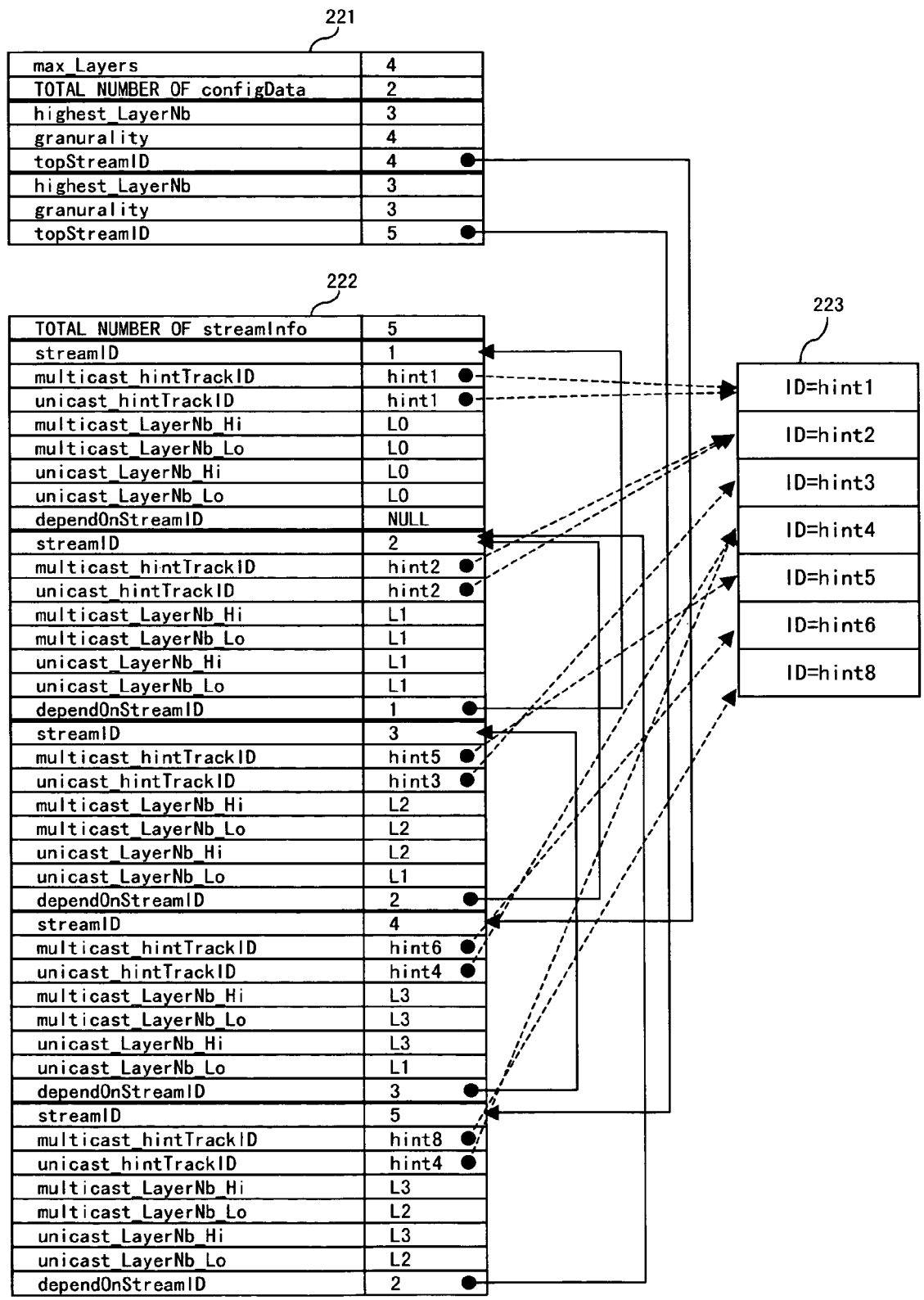
FIG. 21 shows the second side information.

FIG. 21 shows the side information for management of the hint information. The first and second configData structures of the configData list of the side information respectively designate the services of the configurations #1 and #2 shown in FIG. 20. The multicast_hintTrackID and unicast_hintTrackID of each streamInfo structure of the streamInfo list respectively refer to the corresponding hint tracks.

In the configuration #2 shown in FIG. 20, the hint information (hint 4) for the unicast distribution for a transfer at or lower than the upper two layers of the enhancement layer is the same as the hint information for the unicast distribution for a transfer of the L1 through L3 in the configuration #1. Therefore, the same identification information hint 4 is written to the unicast_hintTrackID of the fourth streamInfo structure (stream ID=4) and the unicast_hintTrackID of the fifth streamInfo structure (stream ID=5) shown in FIG. 21.

In the configurations #1 and #2, the hint information for the unicast distribution and the hint information for the multicast distribution for a transfer off the L0 is the same (hint 1). Therefore, the same identification information hint 1 is written to the multicast_hintTrackID and the unicast_hintTrackID of the first streamInfo structure (stream ID=1) shown in FIG. 21.

Furthermore, in the configurations #1 and #2, the hint information for the unicast distribution and the hint information for the multicast distribution for a transfer of the L1 are the same (hint 2). Therefore, the same identification information hint 2 is written to the multicast_hintTrackID and the unicast_hintTrackID of the second streamInfo structure (stream ID=1) shown in FIG. 21.

FIG. 22 shows the tree structure representing the side information shown in FIG. 21. The configData1 shown in FIG. 22 corresponds to the first configData structure shown in FIG. 21, and four nodes can be traced from the configData1. The configData2 corresponds to the second configData structure, and three nodes can be traced from the configData2.

In the side information, the stream data generated according to the information about the streamInfo structure of the root node (immediately before NULL) is the base layer, and the stream data generated according to the streamInfo structure of another node is the enhancement layer. Therefore, the stream data of the base layer can be associated with a port different from the port of the enhancement layer.

In the above-mentioned embodiments, the distribution service of the layered video codec data is mainly explained. The present invention can also be applied to any layered codec data including audio, etc., and further applied to uncoded layered data.

According to the present invention, hint information matching a target service can be easily selected from among plural pieces of hint information indicating the packetizing method of layered codec data, and the streaming distribution matching the service can be realized.

Additionally, depending on the variation of the layer-dividing method based on the finest granularity of layered codec data, common hint information among a plurality of groups can be described without storing redundant hint information when a plurality of groups of hint information are stored in a file. Thus, the storage efficiency of the file data can be improved, and the disk utilization of the system is enhanced.

Furthermore, when hint information is stored, the hint information for the unicast distribution and the hint information for the multicast distribution can be discriminated from each other. Conventionally, since the hint information cannot be discriminated, two files, that is, the file storing the hint information for the unicast distribution and the file storing the hint information for the multicast distribution, have to be prepared. However, according to the present invention, these two files can be collectively managed as one file, and therefore, the file requirement can be reduced by 50%.

What is claimed is:

1. A distribution apparatus which distributes layered codec data while referring to hint information representing a packetizing method for the layered codec data, comprising:
   a data storage memory to store the layered codec data and the hint information;
   a management information storage memory to store management information which manages a plurality of groups of hint information for a plurality of distribution services using plural pieces of hint information as a group for distribution of the layered codec data in a layer-dividing method depending on a distribution service, and represents a correspondence between plural pieces of hint information forming each group and divided layered codec data and a correspondence between the plurality of groups of hint information and a plurality of layer-dividing methods;
   a selection unit implemented in hardware to select a group of hint information matching a target distribution service by referring to the management information; and
   a distribution unit implemented in hardware to packetize and distribute the layered codec data while referring to the selected group of hint information, wherein
   when there is common hint information among a plurality of groups, the data storage unit stores different hint information excluding redundant hint information among the plurality of groups; and the management information storage unit stores management information representing a correspondence between the common hint information and a plurality of distribution services.

2. The apparatus according to claim 1, wherein
The management information storage memory stores management information representing a group of hint information for use in multicast distribution, unicast distribution, or both multicast distribution and unicast distribution.

3. The apparatus according to claim 1, wherein
The management information storage memory stores management information comprising a plurality of stream information structures having reference information for reference to hint information and designation information for designation of a layer of the divided layered codec data, and a plurality of data structures for management of two or more stream information structures corresponding to each of the plurality of layer-dividing methods.

4. The apparatus according to claim 3, wherein
The selection unit obtains a data structure matching granularity of stepwise image quality change in the target distribution service, refers to hint information according to reference information of a stream information structure managed by the obtained data structure, and determines whether or not bit rate information of the referenced hint information is appropriate for the target distribution service, thereby selecting a group of hint information matching the target distribution service.

5. A distribution apparatus which distributes layered codec data while referring to hint information representing a packetizing method for the layered codec data, comprising:
   a data storage memory to store the layered codec data and the hint information;
   a management information storage memory to store management information which manages a plurality of groups of hint information for a plurality of distribution services using plural pieces of hint information as a group for distribution of the layered codec data in a layer-dividing method depending on a distribution service, and represents a correspondence between plural pieces of hint information forming each group and divided layered codec data and a correspondence between the plurality of groups of hint information and a plurality of layer-dividing methods;
   a selection unit implemented in hardware to select a plurality of groups of hint information matching a target distribution service by referring to the management information; and
   a distribution unit implemented in hardware to packetize and distribute the layered codec data while referring to the selected groups of hint information, wherein
   when there is common hint information among a plurality of groups, the data storage unit stores different hint information excluding redundant hint information among the plurality of groups; and the management information storage unit stores management information representing a correspondence between the common hint information and a plurality of distribution services.

6. A distribution apparatus which distributes layered codec data while referring to hint information representing a packetizing method for the layered codec data, comprising:
   a data storage memory to store the layered codec data and the hint information;
   a management information storage memory to store management information which manages a plurality of groups of hint information corresponding to a plurality of layer-dividing methods using plural pieces of hint information as a group for distribution of the layered codec data by layer-dividing the layered codec data, and represents a correspondence between each layer-dividing method and each piece of hint information;
   a selection unit implemented in hardware to select a group of hint information matching a target distribution service by referring to the management information; and
   a distribution unit implemented in hardware to packetize and distribute the layered codec data while referring to the selected group of hint information, wherein
   when there is common hint information among a plurality of groups, the data storage unit stores different hint information excluding redundant hint information among the plurality of groups; and the management information storage unit stores management information representing a correspondence between the common hint information and a plurality of layer-dividing methods.

7. A distributing method for distributing layered codec data while referring to hint information representing a packetizing method for the layered codec data, comprising:
   referring to, by a distribution apparatus, management information which manages a plurality of groups of hint information for a plurality of distribution services using plural pieces of hint information as a group for distribution of the layered codec data in a layer-dividing method depending on a distribution service, and represents a correspondence between plural pieces of hint information forming each group and divided layered codec data and a correspondence between the plurality of groups of hint information and a plurality of layer-dividing methods, and selecting a group of hint information matching a target distribution service; and packetizing and distributing the layered codec data by the distribution apparatus while referring to the selected group of hint information, wherein when there is common hint information among a plurality of groups, the plurality of groups of hint information includes different hint information excluding redundant hint information among the plurality of groups; and the management information represents a correspondence between the common hint information and a plurality of distribution services.

8. A distributing method for distributing layered codec data while referring to hint information representing a packetizing method for the layered codec data, comprising:

referring to, by a distribution apparatus, management information which manages a plurality of groups of hint information corresponding to a plurality of layer-dividing methods using plural pieces of hint information as a group for distribution of the layered codec data by layer-dividing the layered codec data, and represents a correspondence between each layer-dividing method and each piece of hint information and selecting a group of hint information matching a target distribution service; and packetizing and distributing the layered data by the distribution apparatus while referring to the selected group of hint information, wherein when there is common hint information among a plurality of groups, the plurality of groups of hint information includes different hint information excluding redundant hint information among the plurality of groups; and the management information represents a correspondence between the common hint information and a plurality of layer-dividing methods.

* * * * *